(12) United States Patent
Jiang

(10) Patent No.: US 6,498,828 B2
(45) Date of Patent: Dec. 24, 2002

(54) SYSTEM AND METHOD OF COMPUTER TOMOGRAPHY IMAGING USING A CERIUM DOPED LUTETIUM ORTHOSILICATE SCINTILLATOR

(75) Inventor: Haochuan Jiang, Brookfield, WI (US)

(73) Assignee: General Electric Company, Milwaukee, WI (US)

( * ) Notice: Subject to any disclaimer, the term of this patent is extended or adjusted under 35 U.S.C. 154(b) by 52 days.

(21) Appl. No.: 09/681,063

(22) Filed: Dec. 15, 2000

(65) Prior Publication Data

US 2002/0075992 A1 Jun. 20, 2002

(51) Int. Cl.$^7$ .............................................. A61B 6/00
(52) U.S. Cl. ..................... 378/19; 250/367; 250/483.1; 252/306.4 R
(58) Field of Search .................. 378/19; 252/301.4 R; 250/367, 483.1

(56) References Cited

U.S. PATENT DOCUMENTS

| | | | | |
|---|---|---|---|---|
| 4,525,628 A | * | 6/1985 | DiBlanca et al. | 250/367 |
| 4,958,080 A | * | 9/1990 | Melcher | 250/483.1 |
| 5,057,692 A | * | 10/1991 | Greskovich et al. | 250/361 R |
| 6,093,347 A | * | 6/2000 | Lynch et al. | 250/301.4 |

* cited by examiner

Primary Examiner—Robert H. Kim
Assistant Examiner—Therese Barber
(74) Attorney, Agent, or Firm—Timothy J. Ziolkowski; Michael A. DellaPenna

(57) ABSTRACT

A system and method of computer tomography imaging using a cerium-doped lutetium orthosilicate scintillator are provided. The system includes a high frequency electromagnetic energy projection source to project high frequency energy toward an object, such as a patient. A scintillator array having a plurality of cerium-doped lutetium orthosilicate scintillators therein receives the high frequency energy attenuated by the object and emits light energy based on the attenuated energy received. A photodiode array including a plurality of photodiodes is optically-coupled to the scintillator array and configured to detect the light energy and discharge output to a data processing system to produce a visual display. Each scintillator of the scintillator array is formed into a transparent glass ceramic having a high crystalline phase by combing glass-forming compounds in a glass forming system. A method of combining glass-forming compounds to form the cerium-doped lutetium orthosilicate into a transparent glass ceramic is also provided.

23 Claims, 3 Drawing Sheets

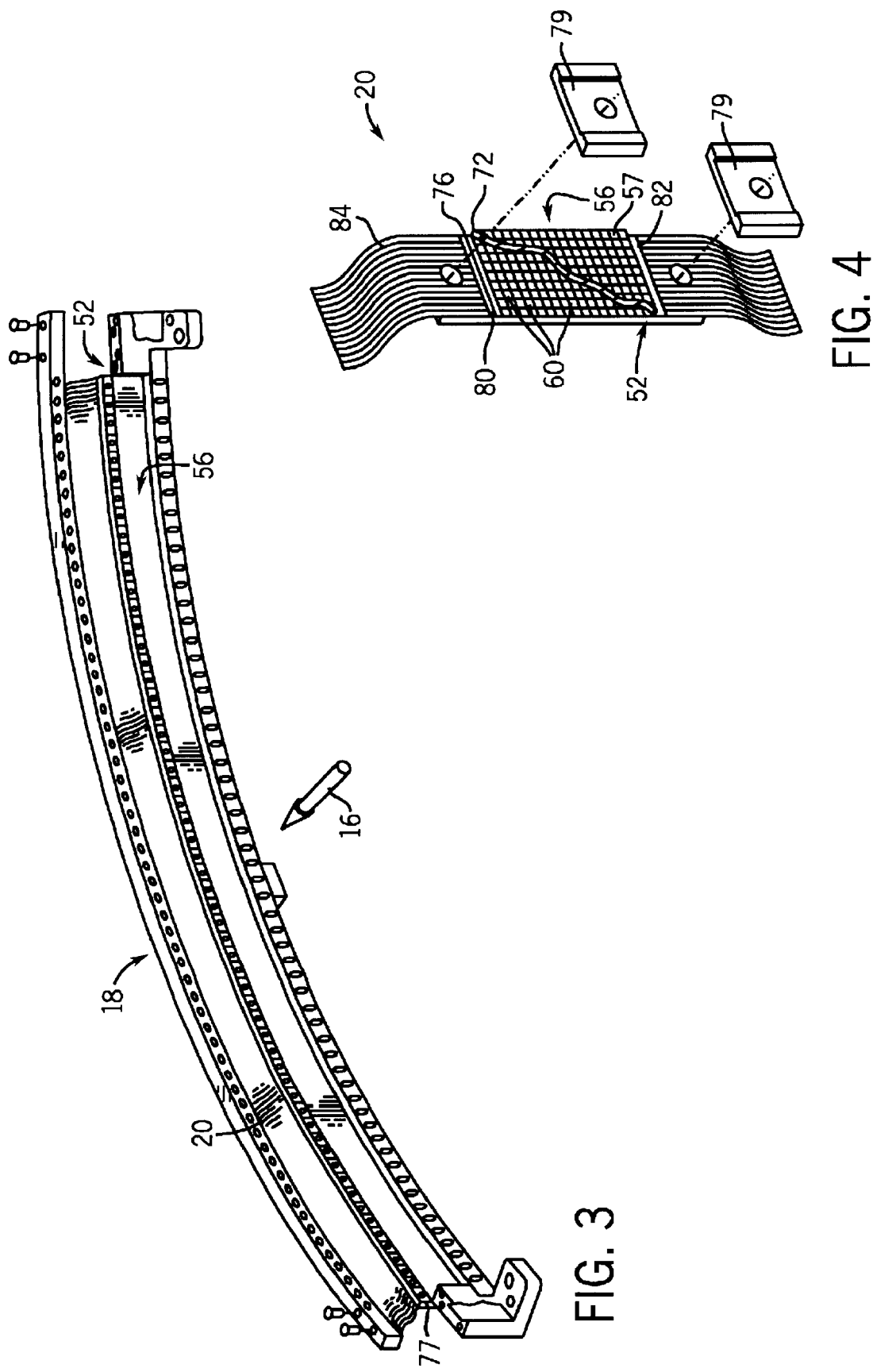

SYSTEM AND METHOD OF COMPUTER TOMOGRAPHY IMAGING USING A CERIUM DOPED LUTETIUM ORTHOSILICATE SCINTILLATOR

BACKGROUND OF THE INVENTION

The present invention relates generally to computed tomography imaging and, more particularly, to an apparatus and method of converting x-rays to light energy for use with computed tomography systems.

Typically, in computed tomography (CT) imaging systems, an x-ray source emits a fan-shaped beam toward an object, such as a patient. The beam, after being attenuated by the object, impinges upon an array of radiation detectors. The intensity of the attenuated beam radiation received at the detector array is typically dependent upon the attenuation of the x-ray beam by the object. Each detector element of the detector array produces a separate electrical signal indicative of the attenuated beam received by each detector element. The electrical signals are transmitted to a data processing unit for analysis which ultimately results in the formation of an image.

Generally, the x-ray source and the detector array are rotated with a gantry within an imaging plane and around the object. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator.

In one known CT imaging system, each scintillator of a detector array comprises thallium-based cesium iodide (CsI:Tl). Thallium-based cesium iodide and other scintillator compositions such as gadolinium sulfate ($Gd(SO_3)$) have significant light output. However, thallium-doped cesium iodide, gadolinium sulfate, and other known scintillator compositions achieve approximately 90% decay in approximately 3–1000 microseconds. This delay in decay results in residual effects that oftentimes cause inefficient light emission and detection, and overall poor performance of the CT system.

It would therefore be desirable to have a scintillator with sufficient light output, but reduced decay time.

SUMMARY OF THE INVENTION

The present invention provides a detector for a CT imaging system and method of use that solves the aforementioned drawbacks. The detector includes a focused scintillator for receiving and converting high frequency electromagnetic energy to light energy. The detector further includes a photodiode positioned adjacent to the scintillator and is configured to receive light energy discharged through a light exiting surface of the scintillator. The detector also includes electrical leads connected from the photodiode to a data processing unit. Signal outputs of the photodiodes are transmitted to the data processing unit to facilitate image reconstruction. The CT system provides for a gantry having an output for projecting high frequency electromagnetic energy toward the tapered scintillator.

In accordance with one aspect of the invention, a detector including a scintillator array is provided. The scintillator array includes at least one scintillator comprising lutetium orthosilicate. The scintillator receives high frequency electromagnetic energy and converts that energy to light energy. A photodiode array comprising at least one photodiode is optically coupled to the scintillator array and is configured to detect light output of the scintillator. Each photodiode of the photodiode array produce outputs that are transmitted by a plurality of electrical interconnects to a data acquisition system.

In accordance with another aspect of the invention, a computed tomography system is provided. The system includes a rotatable gantry having an opening and a high frequency electromagnetic energy projections source capable of projecting high frequency energy toward an object. A scintillator array includes a plurality of scintillators each comprising lutetium orthosilicate and receives the high frequency electromagnetic energy attenuated by the object. A photodiode array is optically coupled to the scintillator array and is configured to detect light energy emitted therefrom. The photodiode array produces outputs that are transmitted to a data processing system by a plurality of electrical interconnects. The system further includes a computer capable of producing a visual display based upon the photodiode outputs transmitted to the data processing system.

In accordance with yet another aspect of the invention, a method of computed tomography imaging is provided. The method includes the steps of providing a scintillator array having a plurality of scintillators wherein each scintillator comprises lutetium orthosilicate. The method further includes directing high frequency electromagnetic energy to the scintillator array and coupling a photodiode array having a plurality of photodiodes to the scintillator array. The method also includes the step of discharging light energy from the scintillator array to the photodiode array and transmitting photodiode output to a data processing system for image construction. The method further includes displaying a constructed image based on the photodiode output transmitted to the data processing system for image construction.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention. In the drawings:

FIG. 3 is a perspective view of a CT system detector array.

FIG. 4 is a perspective view of a detector shown in FIG. 3.

DETAILED DESCRIPTION

The operating environment of the present invention is described with respect to a four-slice computed tomography (CT) system. However, those of ordinary skill in the art will appreciate that the present invention is equally applicable for use with single-slice or other multi-slice configurations. Moreover, the present invention will be described with respect to the detection and conversion of x-rays. However, one of ordinary skill in the art will further appreciate, that the present invention is equally applicable for the detection, conversion, and convergence of other high frequency electromagnetic energy.

Figure 1:
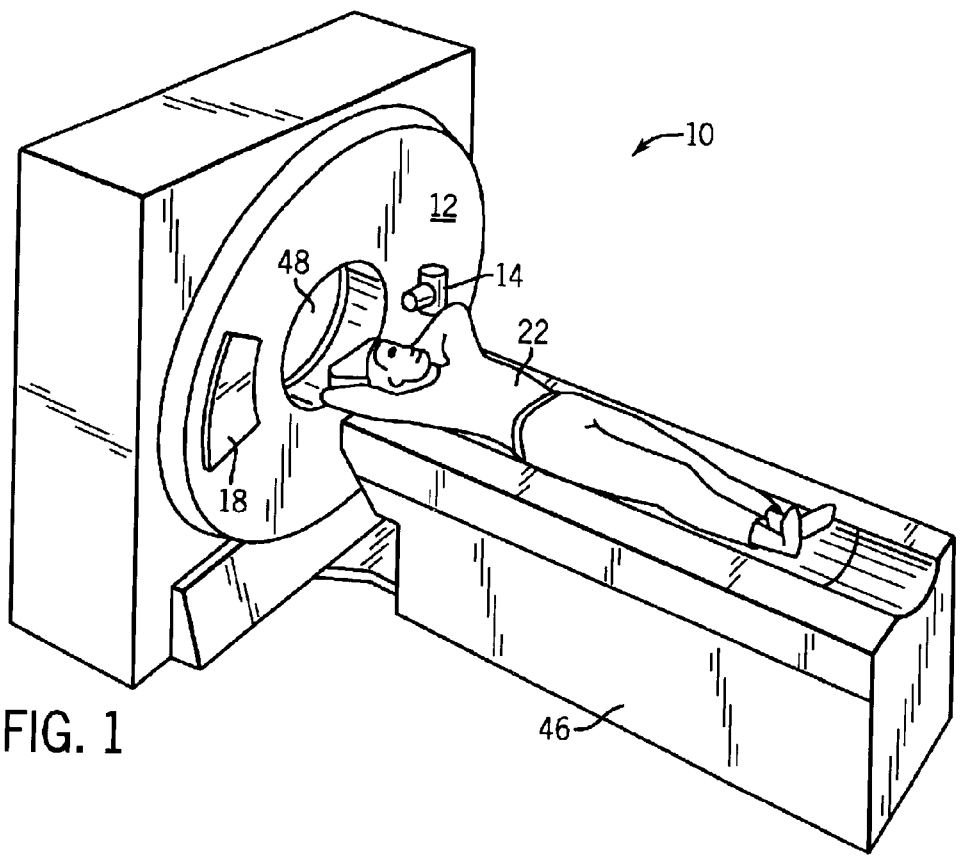
FIG. 1 is a pictorial view of a CT imaging system.
Figure 2:
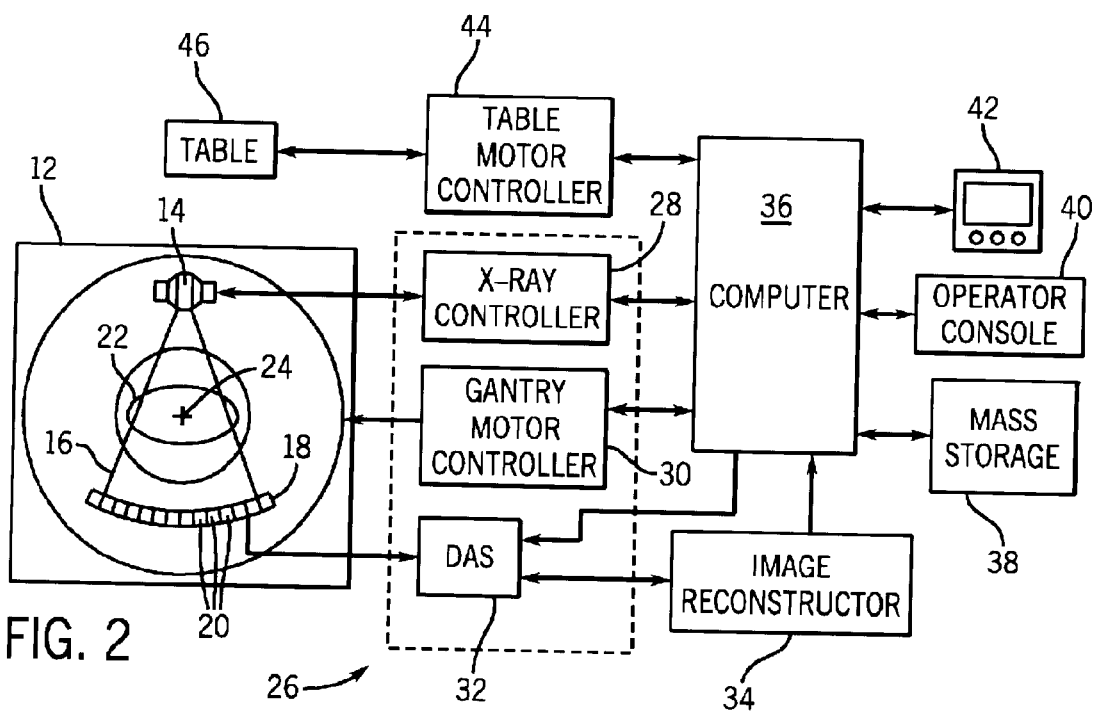
FIG. 2 is a block schematic diagram of the system illustrated in FIG. 1.

Referring to FIGS. 1 and 2, a computed tomography (CT) imaging system 10 is shown as including a gantry 12 representative of a third generation CT scanner.

Gantry 12 has an x-ray source 14 that projects a beam of x-rays 16 toward a detector array 18 on the opposite side of the gantry 12. Detector array 18 is formed by a plurality of detectors 20 which together sense the projected x-rays that pass through a medical patient 22. Each detector 20 produces an electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. A data acquisition system (DAS) 32 in control mechanism 26 samples analog data from detectors 20 and converts the data to digital signals for subsequent processing. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves portions of patient 22 through a gantry opening 48.

As shown in FIGS. 3 and 4, detector array 18 includes a plurality of detectors 20. Each detector 20 includes a high density photodiode array 52 and a multi-dimensional scintillator array 56 positioned above the photodiode array 52. A collimator (not shown) is positioned above the scintillator array 56 to collimate x-ray beams 16 before such beams impinge upon scintillator array 56. Photodiode array 52 includes a plurality of photodiodes 60, deposited or formed on a silicon chip. Scintillator array 56, as known in the art, is positioned over the photodiode array 52. Photodiodes 60 are optically coupled to scintillator array 56 and are capable of transmitting signals representative of the light output of the scintillator array 56. Each photodiode 60 produces a separate low level analog output signal that is a measurement of the attenuated beam entering a corresponding scintillator 57 of scintillator array 56. Photodiode output lines 76 may, for example, be physically located on one side of detector 20 or on a plurality of sides of detector 20. As shown in FIG. 4, photodiode output lines 76 are located on opposing sides of the photodiode array 52.

In one embodiment, as shown in FIG. 3, detector array 18 includes 57 detectors 20. Each detector 20 includes a photodiode array 52 and scintillator array 56, each having an array size of 16×16. As a result, arrays 52 and 56 have 16 rows and 912 columns (16×57 detectors) each, which allows 16 simultaneous slices of data to be collected with each rotation of gantry 12. The scintillator array 56 is coupled to the photodiode array 52 by a thin film of transparent adhesive (not shown).

Switch arrays 80 and 82, FIG. 4, are multi-dimensional semiconductor arrays having similar width as photodiode array 52. In one preferred embodiment, the switch arrays 80 and 82 each includes a plurality of field effect transistors (FET). Each FET is electrically connected to a corresponding photodiode 60. The FET array has a number of output leads electrically connected to DAS 32 for transmitting signals via a flexible electrical interface 84. Particularly, about one-half of the photodiode outputs are electrically transmitted to switch array 80 and the other one-half of the photodiode outputs are electrically transmitted to switch array 82.

Each detector 20 is secured to a detector frame 77, FIG. 3, by mounting brackets 79.

Switch arrays 80 and 82 further include a decoder (not shown) that controls, enables, disables, or combines photodiode output in accordance with a desired number of slices and slice resolutions. In one embodiment defined as a 16 slice mode, decoder instructs switch arrays 80 and 82 so that all rows of the photodiode array 52 are activated, resulting in 16 simultaneous slices of data available for processing by DAS 32. Of course, many other slice combinations are possible. For example, decoder may also enable other slice modes, including one, two, and four-slice modes.

Figure 5:
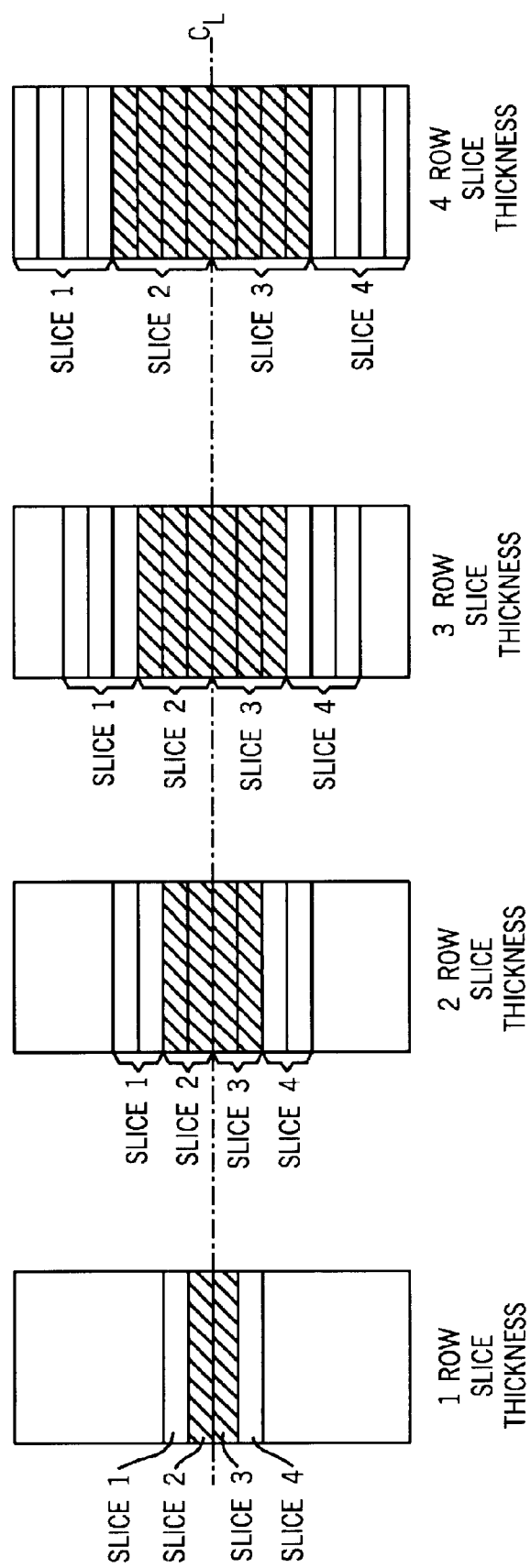
FIG. 5 is illustrative of various configurations of the detector in FIG. 4 in a four-slice mode.

As shown in FIG. 5, by transmitting the appropriate decoder instructions, switch arrays 80 and 82 can be configured in the four-slice mode so that the data is collected from four slices of one or more rows of photodiode array 52. Depending upon the specific configuration of switch arrays 80 and 82 as defined by the decoder, various combinations of photodiodes 60 of the photodiode array 52 can be enabled, disabled, or combined so that the slice thickness may consist of one, two, three, or four rows of photodiode array elements 60. Additional examples include, a single slice mode including one slice with slices ranging from 1.25 mm thick to 20 mm thick, and a two slice mode including two slices with slices ranging from 1.25 mm thick to 10 mm thick. Additional modes beyond those described are contemplated.

The present invention contemplates a novel composition for each scintillator of scintillator array 56. In a preferred embodiment, each scintillator comprises cerium-doped lutetium orthosilicate ($Lu_2SiO_5$:Ce). $Lu_2SiO_5$:Ce has an emission peak of approximately 420 nm. and a light output of approximately one-half that of other known scintillator compositions, such as, thallium-doped cesium iodide. $Lu_2SiO_5$:Ce, however, has an extremely short decay time. In one preferred embodiment, $Lu_2SiO_5$:Ce attains 90% decay in approximately 100 nanoseconds. The value of decay time is indicative of the afterglow of light for each scintillator subsequent to the ceasing of the high frequency electromagnetic energy projection toward the scintillator array. The afterglow of the present invention is extremely low when compared to known compositions of thallium-doped cesium iodide which in one known embodiment has an afterglow time of 7700 nanoseconds.

In a preferred embodiment the scintillator is formed into a transparent glass ceramic having a high crystalline phase. To form the transparent glass ceramic having a high crystalline phase, silicon oxide, lutetium oxide, cerium oxide, potassium oxide, and barium oxide are combined. A product of combining the aforementioned compounds is a glass ceramic scintillator of $Lu_2SiO_5$:Ce.

Alternatively, the transparent glass ceramic having a high crystalline phase may also be formed by combining the aforementioned compounds with either gadolinium oxide or aluminum oxide.

In another preferred embodiment, the $Lu_2SiO_5$:Ce scintillator is formed into ceramic material through sintering. By sintering the $Lu_2SiO_5$:Ce powder, pores between the particles are removed which results in a densification of the scintillator material. Because the $Lu_2SiO_5$:Ce has a monoclinic structure rather than a cubic crystalline structure, sintering produces a translucent ceramic rather than transparent. As a result, the translucent ceramic, in a preferred embodiment, is converted into a transparent ceramic so that the light output and detection efficiency is improved.

The present invention claims a scintillator comprising cerium-doped lutetium orthosilicate for a scintillator array of a computed tomography system. In a preferred embodiment, the scintillator array is configured as a transparent glass ceramic having a high crystalline phase. In an alternate embodiment, the scintillator array is formed into a fiber glass bundle or is formed into a translucent ceramic material through sintering. Because the sintered ceramic material is not fully transparent, it is necessary to convert the translucent ceramic into transparent using solid state conversion.

Accordingly, the present invention claims a method of computed tomography imaging comprising the steps of providing a scintillator array having a plurality of scintillators including lutetium orthosilicate. In a preferred embodiment, the lutetium orthosilicate is doped with cerium. High frequency electromagnetic energy is directed toward the scintillator array through an object, such as a patient, wherein each scintillator of the scintillator array produces a light output that is detected by a photodiode of a photodiode array coupled thereto. The photodiode outputs a signal that is transmitted to a data processing system for image construction and subsequent display. Preferably, the cerium-doped lutetium orthosilicate is formed into a transparent glass scintillator by combing silicate oxide, lutetium oxide, cerium oxide, potassium oxide, and barium oxide. Alternatively, the transparent glass scintillator may be formed by combining either gadolinum oxide or aluminum oxide with silicate oxide, lutetium oxide, cerium oxide, potassium oxide, and barium oxide. As a result, a transparent glass ceramic scintillator is formed having a high crystalline phase.

Alternatively, the cerium-doped lutetium orthosilicate is sintered into a ceramic. The resultant ceramic is typically translucent, therefore, to improve light emissions the scintillator must be converted into a transparent ceramic.

The present invention has been described in terms of the preferred embodiment, and it is recognized that equivalents, alternatives, and modifications, aside from those expressly stated, are possible and within the scope of the appending claims.

What is claimed is:

1. A detector comprising:
    a scintillator array having at least one scintillator comprising $Lu_2SiO_5$ therein and wherein the at least one scintillator has a monoclinic structure;
    at least one photodiode forming a photodiode array optically coupled to the scintillator array; and
    a plurality of electrical interconnects capable of transmitting photodiode outputs to a data acquisition system.

2. The detector of claim 1 wherein the scintillator further comprises Cerium.

3. The detector of claim 2 wherein the scintillator is configured as a ceramic.

4. The detector of claim 3 wherein the scintillator is configured as a glass ceramic.

5. The detector of claim 2 wherein the scintillator is a product of combining $SiO_2$, $Lu_2O_3$, $CeO_2$, $K_2O$, and BaO(SrO).

6. The detector of claim 2 wherein the scintillator is a product of combining $SiO_2$, $Lu_2O_3$, $CeO_2$, $K_2O$, BaO(SrO), and one of $Gd_2O_3$ and $Al_2O_3$.

7. The detector of claim 1 wherein the scintillator has a high crystalline phase.

8. The detector of claim 1 wherein the scintillator is configured as one of a fiber glass and a transparent glass.

9. A computed tomography system comprising:
    a rotatable gantry having an opening;
    a high frequency electromagnetic energy projection source to project high frequency energy toward an object;
    a scintillator array having a plurality of scintillators to receive high frequency electromagnetic energy attenuated by the object wherein each scintillator comprises $Lu_2SiO_5$ and has a non-cubic crystalline structure;
    a photodiode array having a plurality of photodiodes, wherein the photodiode array is optically coupled to the scintillator array and is configured to detect light energy emitted therefrom;
    a plurality of electrical interconnects configured to transmit photodiode outputs to a data processing system; and
    a computer to produce a visual display based upon the photodiode outputs transmitted to the data processing system.

10. The system of claim 9 wherein each scintillator further comprises Cerium.

11. The system of claim 9 wherein each scintillator has an emission peak between 400 nm and 450 nm.

12. The system of claim 11 wherein each scintillator has an emission peak of approximately 420 nm.

13. The system of claim 9 wherein each scintillator has an afterglow of approximately zero after 100 ns.

14. The system of claim 9 wherein each scintillator has a monoclinic crystalline structure.

15. A method of CT imaging comprising the steps of:
    providing scintillator array having a plurality of scintillators comprising $Lu_2SiO_5$;
    coupling a photodiode array having a plurality of photodiodes to the scintillator array;
    directing high frequency electromagnetic energy to the scintillator array;
    discharging light energy from the scintillator array to the photodiode array;
    transmitting photodiode output to a data processing system for image construction; and
    displaying a constructed image.

16. The method of claim 15 wherein the step of providing a scintillator array further comprises the step of doping the $Lu_2SiO_5$ with Cerium.

17. The method of claim 16 further comprising the step of sintering the cerium doped $Lu_2SiO_5$ into a ceramic.

18. The method of claim 17 further comprising the step of converting the ceramic to a transparent ceramic.

19. The method of claim 16 further comprising the step of glass forming the cerium doped $Lu_2SiO_5$.

20. The method of claim 19 further comprising the step of providing a scintillator having a high crystalline phase.

21. The method of claim 19 further comprising the step of combining $SiO_2$, $Lu_2$, $CeO_2$, $K_2O$ and BaO(SrO).

22. The method of claim 21 further comprising the step of adding one of $Gd_2O_3$ and $Al_2O_3$.

23. The method of claim 15 comprising the step of directing x-rays to the scintillator array.

* * * * *

UNITED STATES PATENT AND TRADEMARK OFFICE
CERTIFICATE OF CORRECTION

PATENT NO. : 6,498,828 B2  Page 1 of 1
APPLICATION NO. : 09/681063
DATED : December 24, 2002
INVENTOR(S) : Haochuan Jiang It is certified that error appears in the above-identified patent and that said Letters Patent is hereby corrected as shown below:

Col. 6, line 61, (Claim 21) delete "$Lu_2$" and substitute therefore "$Lu_2O_3$"

Signed and Sealed this

Eighth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,498,828 B2 Page 1 of 1
APPLICATION NO. : 09/681063
DATED : December 24, 2002
INVENTOR(S) : Haochuan Jiang It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (52) days Delete the phrase "by 52 days" and insert -- by 47 days --

Signed and Sealed this

Second Day of September, 2008

JON W. DUDAS
*Director of the United States Patent and Trademark Office*